United States Patent [19]

Frandsen

[11] Patent Number: 4,769,138

[45] Date of Patent: Sep. 6, 1988

[54] AIR-DRIVEN CONTACT FILTER

[76] Inventor: Aksel S. Frandsen, Sellerup Strandvej 7, DK-Borkop, Denmark, 7080

[21] Appl. No.: 51,515

[22] Filed: May 19, 1987

[30] Foreign Application Priority Data

May 26, 1986 [DK] Denmark .......................... 2444/86

[51] Int. Cl.[4] .............................................. C02F 3/08
[52] U.S. Cl. .................................. 210/150; 210/619; 261/92
[58] Field of Search ............... 210/615, 619, 150, 151; 261/92

[56] References Cited

U.S. PATENT DOCUMENTS

| | | | |
|---|---|---|---|
| 2,586,692 | 2/1952 | Morel | 210/150 |
| 3,613,890 | 10/1971 | Hellqvist | 210/150 |
| 3,886,074 | 5/1975 | Prosser | 210/150 |
| 4,093,539 | 6/1978 | Guarino | 210/151 |
| 4,160,736 | 7/1979 | Prosser | 210/150 |
| 4,267,051 | 5/1981 | Uhlmann | 210/150 |
| 4,268,385 | 5/1981 | Yoshikawa | 210/150 |
| 4,330,408 | 5/1982 | McClure | 210/150 |
| 4,351,721 | 9/1982 | Frandsen | 210/150 |
| 4,676,892 | 6/1987 | Grabowski | 210/150 |

FOREIGN PATENT DOCUMENTS

| | | | |
|---|---|---|---|
| 14453 | 8/1980 | European Pat. Off. | 210/150 |
| 2843921 | 4/1980 | Fed. Rep. of Germany | 210/150 |
| 3409111 | 9/1985 | Fed. Rep. of Germany | 210/150 |
| 53-123562 | 10/1978 | Japan | 210/150 |
| 54-6357 | 1/1979 | Japan | 210/150 |

*Primary Examiner*—Ernest G. Therkorn
*Attorney, Agent, or Firm*—Holman & Stern

[57] ABSTRACT

An air-driven rotary contact filter for biological cleaning of waste water has spiral channels mounted on a perforated rotatable center pipe having its axis of rotation disposed below the surface of the water whereby the filter is partially submerged with inlets to the channels at the central mixing chamber of the rotor below the water surface and some of the outlets at the periphery of the rotor above the water surface, so that when air is blown axially into the center pipe water is displaced on one side of the rotor whereby the channels will rotate due to the greater weight of water on the other side of the rotor.

7 Claims, 1 Drawing Sheet

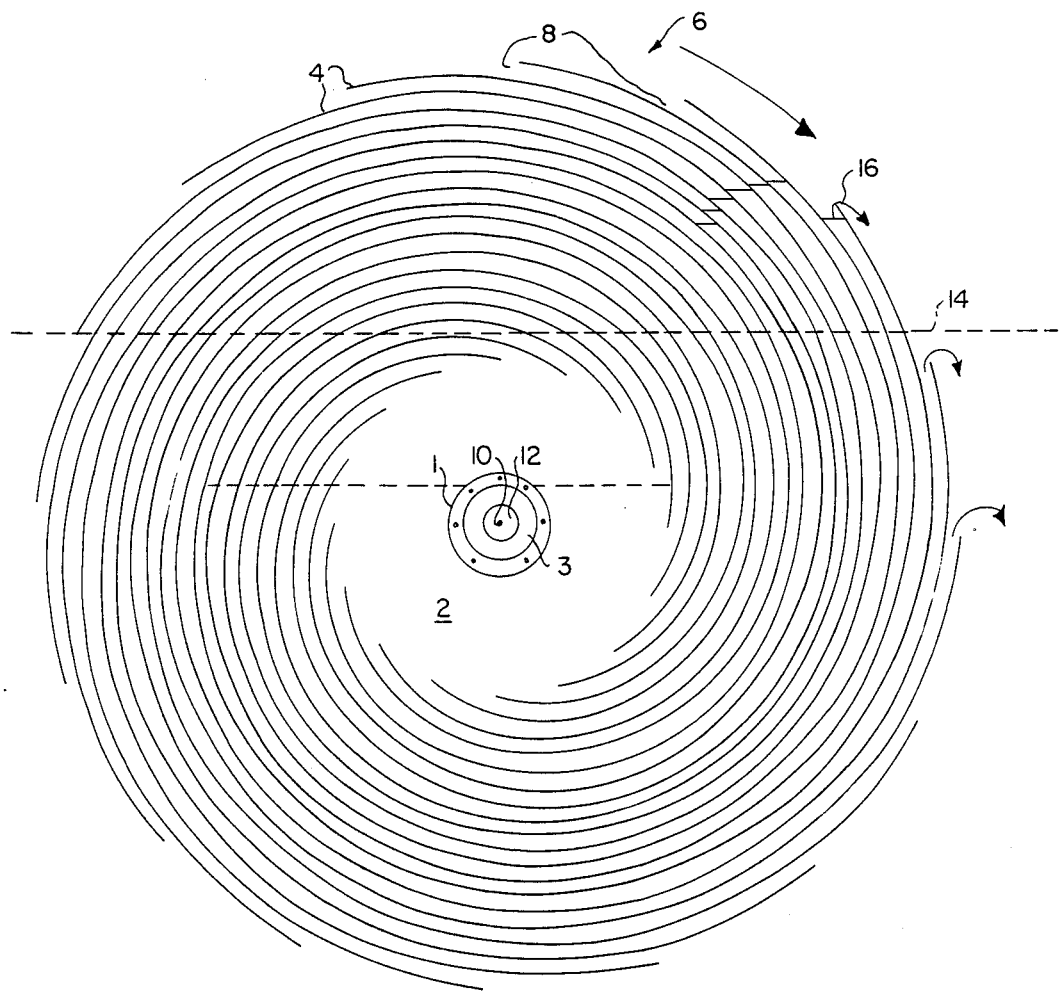

AIR-DRIVEN CONTACT FILTER

BACKGROUND OF THE INVENTION

1. Field of the Invention

The present invention relates to an air-driven rotary contact-filter designed for use in a system for biological cleaning of waste water and more particularly to such a filter having a rotor in the shape of a spiral wound channel rotatable about a horizontal axis.

2. Description of the Prior Art

To avoid use of gear and/or other mechanical transmissions it has been proposed to provide the rotor with vanes on the periphery and to inject air under the rotor slightly off-center so that the air is caught by the vanes at one side, thus causing the rotor to rotate.

Air injected in this way apparently yields work-/torque during half a rotor revolution, but in practice the torque is only present over a rather short angle of rotation, viz. in the part of the angle of rotation where the upward force is off-set most relatively to a vertical line through the center.

In order to utilize the torque resulting from this rather short distance, the rotor has to be submerged almost completely. Therefore the typical counter-pressure against injected air is at least two thirds of the rotor diameter, i.e. fans are required which have an energy waste relative to this counter-pressure.

BRIEF SUMMARY OF THE INVENTION

The air drive rotor according to the invention differs from the prior art apparatus as the torque arises when the water content in the submerged part of the spirals composing the device is offset by injection of air so that their weight is mainly at one side of the rotor, and so that at the same time the injected air creates a lift at the other side.

Besides, the invention differs from the prior art apparatus in that the counter-pressure is considerably lower. Effective utilization of the injected air is obtained at a counter-pressure of only 25 cm even if the rotor diameter is upwards of 3 meters.

BRIEF DESCRIPTION OF THE DRAWING

The invention will now be described more definitely with reference to the accompanying drawing which is a schematic cross-sectional view perpendicular to the axis of rotation through a contact filter according to the invention.

DETAILED DESCRIPTION

On a vertically, rotatably placed center pipe 1 at least two circular gable plates are placed. Near the center pipe in these gable plates openings 3 are provided to a mixing chamber 2 surrounding the center pipe.

Between two adjoining gable playtes a number of spiral guiding plates 4 extend from the mixing chamber 2 to the periphery of the gable plates thus forming a rotor 6 with spiralwound channels 8 which are rotatable around the axis 10 of the center pipe 1.

The center pipe 1 is closed at one end, whereas the other end has an inlet stub 12 for connection with a compressed air source. In the mantle surface of the center pipe 1 there are piercings (not shown) which are placed and dimensioned in a way that air let in at the inlet stub 12 leaves the pipe evenly in the radial direction.

The described contact filter is placed with the axis of rotation 10 somewhat below a water surface 14 as shown on the drawing, and air is introduced into the center pipe through inlet stub 12. Through the openings 3 in the gable plates water pours into the mixing chamber 2 and the then lowest parts of the spiral wound channels.

The introduced air will displace the water content in the submerged part of the channels (mainly at the left side as shown in the drawing), so that the weight mainly is in one side of the rotor (the right side in the drawing) at the same time as the air gives a lift in the other side. The rotor will therefore revolve clockwise (as shown in the drawing) and is thus driven directly by the introduced air. Water exits channels 8 at the periphery as shown by arrows 16.

When the inner diameter of the center pipe 1 is e.g. 10 cm and its axis is submerged 30 cm the counter-pressure against the introduced air is 25 cm $H_2O$. A contact filter for 1000 person equivalents (PE) only requires 7,5 $m^3$ air per minute. With a standard fan with a max. pressure of 30 cm $H_2O$ the operation costs 0,75 kW per hour. With presupposed perpetual operation the consumption of electricity is less than 7 kW/PE/year.

In a contact filter with several gable plates mounted on a center pipe, e.g. at intervals of 10 cm, wherein pairs of gable plates delimit spiral wound channels mounted next to each other, the possibility of supply of water sets limits to the axial extension of the filter. For that reason it is suggested that, e.g. alternate groups of five sprial wound channels be reversed in directio with respect to the others so that instead of leading water from the mixing chamber to the periphery of the rotor they lead water (and air) from the periphery into the mixing chamber. With such counter directed channels the rotor can have any axial extension.

I claim:

1. In a rotary contact filter for use in a system for biological cleaning of waste water including a rotor having at least one spiral channel through which air and waste water pass partially submerged in a body of water to be treated and rotatable about a horizontal axis at the central portion of the rotor, the improvement comprising:

a mixing chamber in the central portion of said rotor through which the axis of rotation extends;

a central hollow pipe extending through said mixing chamber and having a longitudinal axis coincident with the axis of rotation and being closed at one end thereof;

a source of compressed air connected to the other end of said pipe for feeding air into said pipe;

holes in said pipe for the passage of air from the inside of said pipe to said mixing chamber;

an inner end on said at least one spiral channel communicating with said mixing chamber;

an outer end on said at least one spiral channel passing above the surface of the water during part of the revolution of the rotor;

said rotor having gable plates between which said at least one spiral channel extends; and openings in said gable plates for the passage of water into said rotor;

said central pipe being disposed below the surface of the water so that said compressed air injected into said pipe passes through said holes into said mixing chamber and into said inlet end of said at least one spiral channel and displaces water in said one spiral channel into a part of said channel on substantially the opposite side of said rotor relative to the axis of rotation from said channel inlet causing said rotor to rotate in the direction opposite to the direction in which the spiral channel extends from the inner end to the outer end thereof.

2. The filter as claimed in claim 1 wherein:

said inlets of said spiral channels have substantially the same radius with respect to said axis of rotation; and said outlets of said spiral channels having substantially the same radius with respect to said axis of rotation.

3. The filter as claimed in claim 1 wherein:

said at least one spiral channel comprises a plurality of spiral channels between a pair of said gable plates.

4. The filter as claimed in claim 3 wherein said rotor comprises:

a plurality of sets of units of spiral channels, said units being axially spaced between respective pairs of gable plates, each set comprising five units, and every alternate set having the direction of said spiral channels thereof reversed with respect to the adjacent set.

5. The filter as claimed in claim 3 wherein:

said spiral channels are formed by a plurality of similar spiral plate members between said pair of gable plates.

6. The filter as claimed in claim 5 wherein:

said inlets of said spiral channels have substantially the same radius with respect to said axis of rotation; and said outlets of said spiral channels have substantially the same radius with respect to said axis of rotation.

7. The filter as claimed in claim 6 wherein said rotor comprises:

a plurality of sets of units of spiral channels, said units being axially spaced between respective pairs of gable plates, each set comprising five units, and every alternate set having the direction of said spiral channels thereof reversed with respect to the adjacent set.

* * * * *